(12) United States Patent
Park

(10) Patent No.: US 8,769,672 B2
(45) Date of Patent: Jul. 1, 2014

(54) CODE INJECTION PREVENTION

(75) Inventor: Seung Bae Park, Lidcombe (AU)

(73) Assignee: Symantec Corporation, Mountain View, CA (US)

(*) Notice: Subject to any disclaimer, the term of this patent is extended or adjusted under 35 U.S.C. 154(b) by 1490 days.

(21) Appl. No.: 11/499,209

(22) Filed: Aug. 4, 2006

(65) Prior Publication Data

US 2008/0040800 A1  Feb. 14, 2008

Related U.S. Application Data

(63) Continuation-in-part of application No. 11/499,463, filed on Aug. 4, 2006, now Pat. No. 7,814,549.

(60) Provisional application No. 60/835,417, filed on Aug. 3, 2006.

(51) Int. Cl.
*G06F 21/00* (2013.01)
(52) U.S. Cl.
USPC ............... 726/22; 726/23; 726/24; 713/164; 719/312; 719/313; 719/317
(58) Field of Classification Search
USPC ................... 726/22, 2, 26; 713/164
See application file for complete search history.

(56) References Cited

U.S. PATENT DOCUMENTS

| | | | | |
|---|---|---|---|---|
| 6,698,016 | B1* | 2/2004 | Ghizzoni | 717/162 |
| 7,281,268 | B2* | 10/2007 | Hollander et al. | 726/22 |
| 7,665,143 | B2* | 2/2010 | Havens et al. | 726/26 |
| 7,823,201 | B1* | 10/2010 | Xu | 726/22 |
| 2006/0031672 | A1* | 2/2006 | Soltis et al. | 713/164 |
| 2006/0085854 | A1* | 4/2006 | Agrawal et al. | 726/23 |
| 2006/0130139 | A1* | 6/2006 | Sobel et al. | 726/22 |
| 2007/0079050 | A1* | 4/2007 | Reckless et al. | 711/100 |

OTHER PUBLICATIONS

"Countering Code Injection Attacks With Instruction-Set Randomization"; Kc et al; Proceedings of the 10th ACM conference on Oct. 27-30, 2003, ACM, 10 pages.*
"Defending Against Injection Attacks Through Context-Sensitive String Evaluation"; Berghe et al; p. 132-153, lecture notes in computer science.; Springer-Verlag Berlin Heidelberg 2006.*

* cited by examiner

*Primary Examiner* — Jason Lee
(74) *Attorney, Agent, or Firm* — Holland & Hart LLP

(57) ABSTRACT

A method, computer program product and system for preventing code injection in an operating system. The method 300 includes a checking module 340 hooking a kernel mode OS system call 330 and a request 315 sent to the kernel mode OS system call 330 being directed to the checking module 340. The checking module 340 queries 345 a process database 350 and the checking module 340 then allows or denies the request 315 based on a response from the process database 350.

8 Claims, 3 Drawing Sheets

CODE INJECTION PREVENTION

CROSS-REFERENCE TO THE RELATED APPLICATIONS

This is a continuation-in-part of and claims the benefit of priority from application Ser. No. 11/499,463, filed Aug. 4, 2006, entitled Direct Process Access, issued as U.S. Pat. No. 7,814,549, which is a non-provisional conversion of Provisional Application Ser. No. 60/835,417 filed Aug. 3, 2006, entitled Direct Process Access. Provisional Application Ser. No. 60/835,417 is hereby incorporated by reference in its entirety.

TECHNICAL FIELD

The present invention generally relates to the field of computing and malicious software or software threats, such as for example malicious code being injected into a process running in a processing system, and more particularly to a method, system, computer readable medium of instructions and/or computer program product for preventing malicious code to be injected into an operating system, for example a kernel mode of the operating system.

BACKGROUND ART

One of the major threats to a modern computing system is code injection, in which malware transfers malicious code into an arbitrary process running in the computer system. As this type of malware runs in an address space of the injected process, the injected malicious code's activity is considered to be the injected process' activity, which can compromise the operating system's security based on the process identity.

In addition, any sort of code injection detection engine or software that runs in a user mode can be also relatively easily defeated by malware through various user mode hooking techniques. This makes it relatively easy for malware to subvert a security program's operations.

It is relatively difficult to block or remove malicious runtime code once injected into other innocent processes. Therefore, it is important to prevent malware code -from being injected into innocent processes before code injection occurs, rather than after code injection has already occurred.

Threat/Malware:

As used herein a "threat" includes malicious software, also known as "malware" or "pestware", which includes software that is included or inserted in a part of a processing system for a harmful purpose. The term threat should be read to include possible, potential and actual threats. Types of malware can include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

Hook:

A hook (also known as a hook procedure or hook function) generally refers to a function provided by a software application that receives certain data before the normal or intended recipient of the data. A hook function can thus examine or modify certain data before passing on the data. Therefore, a hook function allows a software application to examine data before the data is passed to the intended recipient.

Hook Chain:

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

Process:

A process is at least one of a running software program or other computing operation, or a part of a running software program or other computing operation, that performs a task. A process is a running instance of a program, including all variables and other states. A multitasking operating system may switch between processes to give the appearance of many processes executing concurrently or simultaneously, though in fact only one process can be executing at any one time per CPU thread.

Module:

A module is a software entity that groups a set of subprograms and data structures. Modules are units that can be compiled separately, which makes modules reusable and allows more than one programmer to work on different modules simultaneously. For example, in Microsoft Windows®, a module could be an executable program, a DLL (Dynamic Link Library), or a kernel driver.

Kernel Mode:

The kernel mode refers to one of the CPU (Central Processing Unit) modes that provides completely unrestricted operation of the CPU. In kernel mode, the CPU may perform any operation provided for by its architecture. Any instruction may be executed, any I/O (Input/Output) operation may be initiated, any area of memory may be accessed, etc.

User Mode:

The user mode refers to one of the CPU modes that has limited operation of the CPU. In user mode, certain restrictions on CPU operations are enforced by hardware. Typically, certain instructions are not permitted, I/O operations may not be initiated and some areas of memory cannot be accessed, etc. Usually the user mode capabilities of the CPU are a subset of the kernel mode capabilities, but in some cases (such as hardware emulation of non-native architectures), they may be significantly different from kernel capabilities, and not just a subset of them.

Kernel Driver:

A kernel driver is a specific type of software running in kernel mode, typically developed to control software and hardware devices or to provide security both for user mode application programs and the operating system.

Hash Table:

A hash table, or a hash map, is a data structure that associates keys with values. The primary operation a hash table supports is a lookup: given a key (e.g. a person's name), find the corresponding value (e.g. that person's telephone number). This works by transforming the key using a hash function into a hash, a number that the hash table uses to locate the desired value.

Hash Function:

A hash function (or Message Digest (MD)) is a technique used to establish whether a file transmitted over a network has been tampered with. A hash function uses a mathematical rule which, when applied to the file, generates a number, usually between 128 and 512 bits. This number is then transmitted with the file to a recipient who reapplies the mathematical rule to the file and compares the resulting number with the original number. If the resulting number and the original number are the same then there is a high probability that the message has not been tampered with, otherwise it is probable that the message has been tampered with.

Computer System:

A computer system may be a type of processing system, terminal, computer or computerised device, personal computer (PC), mobile or cellular telephone, mobile data terminal, portable computer, Personal Digital Assistant (PDA), pager or any other similar type of device. The capability of such a computer system to process, request and/or receive information or data can be provided by software, hardware and/or firmware. A computer system may include or be associated with other devices, for example a local data storage device such as a hard disk drive or solid state drive. A computer with a rootkit is sometimes called a rooted computer.

There is a need for a method, system, computer program product and/or computer readable medium of instructions which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

In various forms, the present invention seeks to provide a method, system, computer readable medium of instructions and/or computer program product for preventing malicious code to be injected into an operating system, for example a kernel mode of the operating system. Currently, the applicant is not aware of any known method or system able to address the problem of malicious code injection at run time in a kernel level of an operating system.

According to a first broad form, the present invention provides a method of preventing code injection in an operating system, the method including: a checking module hooking a kernel mode OS system call; directing a request sent to the kernel mode OS system call to the checking module; the checking module querying a process database; and the checking module allowing or denying the request based on a response from the process database.

According to a second broad form, the present invention provides a computer program product for preventing code injection in an operating system, the computer program product configured to: hook a kernel mode OS system call; receive a request sent to the kernel mode OS system call; query a process database; and receive a response from the process database and thereby allow or deny the request.

According to a third broad form, the present invention provides a system for preventing code injection in an operating system, the system including: (1) at least one memory to store a process database; and, (2) a processor, in communication with the at least one memory, the processor configured to: (a) hook a kernel mode OS system call; (b) receive a request sent to the kernel mode OS system call; (c) query the process database; and (d) receive a response from the process database and thereby allow or deny the request.

Preferably, though not necessarily, the computer program product is, or is part of, one or more of: a driver; a scanning engine; an application; a security program; and anti-malware software.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Processing System

Figure 1:
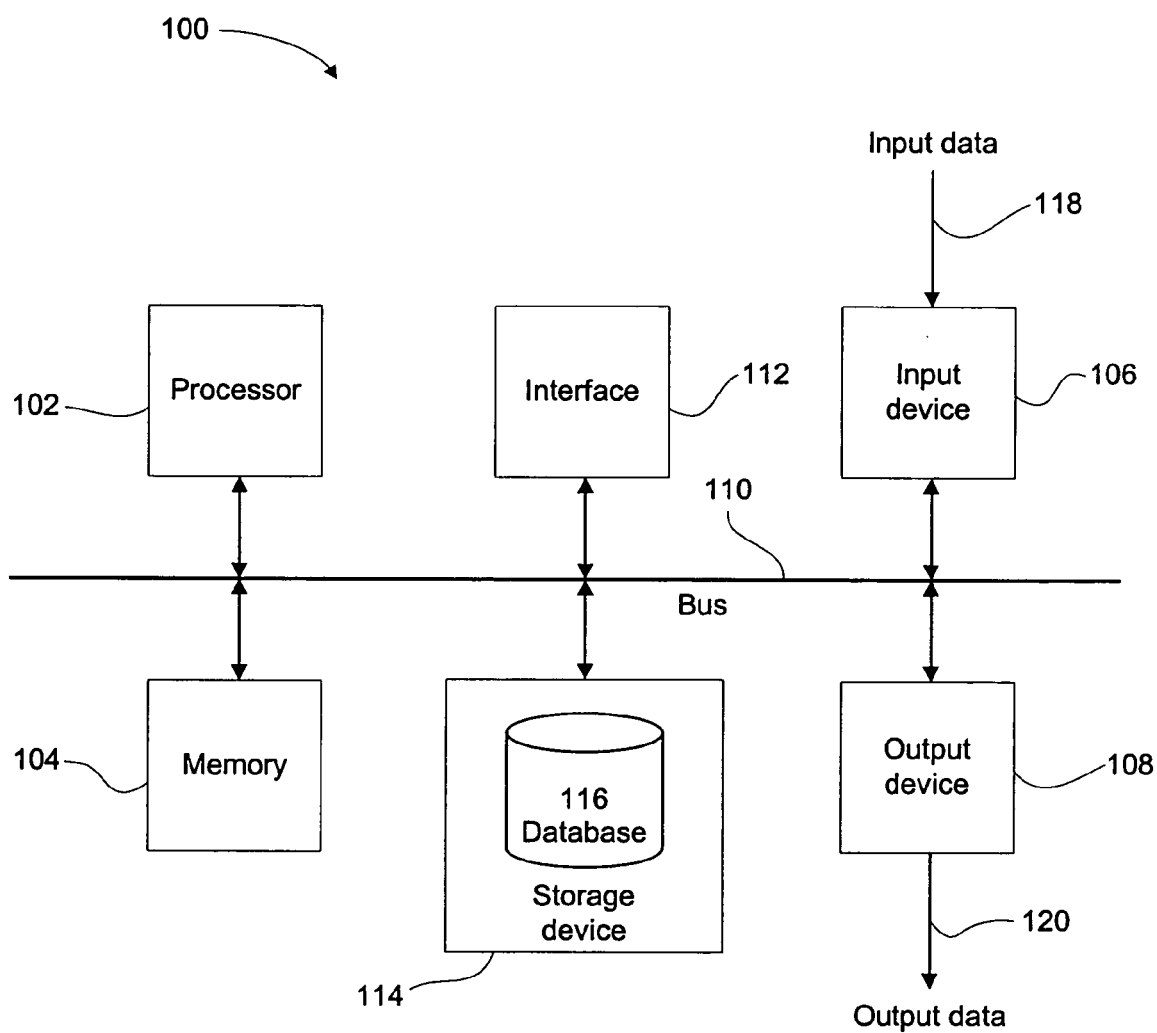
FIG. 1 illustrates an example functional block diagram of a processing system that can be utilised to embody or give effect to a particular embodiment.

A particular embodiment of the present invention can be implemented on a computer system, or more generally a processing system, an example of which is shown in FIG. 1. In particular, processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling processing system 100 to one or more peripheral devices, for example interface 112 could be a PCI card or PC card. At least one storage device 114 which houses at least one database 116 can also be provided. Memory 104 can be any form of memory device, for example, volatile or non-volatile memory, solid state storage devices, magnetic devices, etc. Processor 102 could include more than one distinct processing device, for example to handle different functions within processing system 100.

Memory 104 typically stores an operating system to provide functionality to processing system 100. A file system and files are also typically stored on storage device 114, and/or perhaps memory 104.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. Storage device 114 can be any form of data or information storage means or store, for example, volatile or non-volatile memory, a hard disk drive, solid state storage devices, magnetic devices, etc.

In use, processing system 100 is adapted to allow data or information to be stored in and/or retrieved from, via wired or wireless communication means, the at least one database 116. Interface 112 may allow wired and/or wireless communication between the processing unit 102 and peripheral components that may serve a specialised purpose. The processor 102 may receive instructions as input data 118 via input device 106 and can display processed results or other output to a user by utilising output device 108. More than one input device 106 and/or output device 108 can be provided. It should be appreciated that processing system 100 may be any form of terminal, server, specialised hardware, computer, computer system or computerised device, personal computer (PC), mobile or cellular telephone, mobile data terminal, portable computer, Personal Digital Assistant (PDA), pager or any other similar type of device.

Prior Art System Explanation

Figure 2:
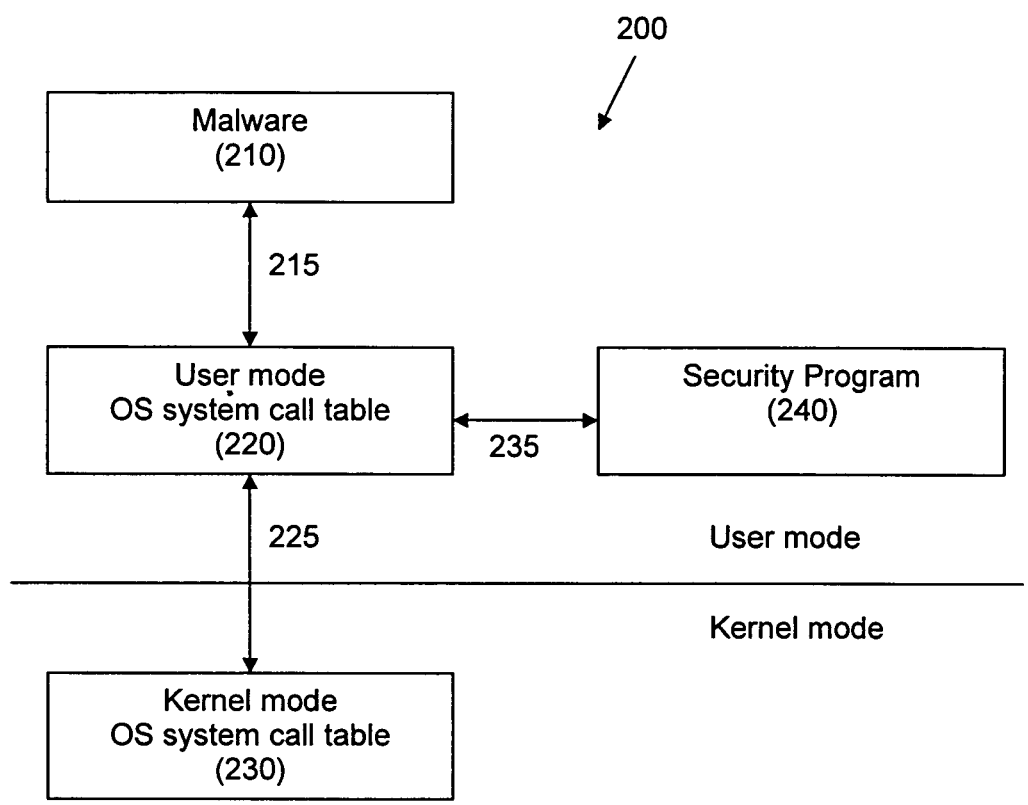
FIG. 2 (prior art) illustrates a currently known method used to monitor a user mode level of an operating system.

Referring to FIG. 2 (prior art), there is illustrated a simplified summary of the steps required to scan an operating system using a currently known security method 200. These steps are as follows:

1. Malware 210 sends a WriteProcessMemory request 215 to the OS (Operating System) system call 220:
   a. WriteProcessMemory request 215 is a function provided by the OS in user mode;
   b. If security program 240 hooked user mode OS system call 220, then:
      i. If malware 210 hooked user mode OS system call 220 overriding security program's 240 previous hooking, then malware 210 forwards the request 215 to kernel mode OS system call 230 as a request 225.
      ii. If malware did not hook user mode OS system call 220, then:
         1. WriteProcessMemory request 215, sent by malware 210, is forwarded to security program 240 as a request 235;
         2. Security program 240 denies request 215 if security program 240 finds request 215 is a malicious attempt to write memory to other process;
         3. Security program 240 allows request 215 by forwarding request 215 to kernel mode OS system call 230 as a request 225.
   c. If security program 240 did not hook user mode OS system call 220, then:
      i. WriteProcessMemory request 215, sent by malware 210, is forwarded to kernel mode OS system call 230 as a request 225;
      ii. OS system call 230 processes the request successfully, and malicious code is injected into an innocent process as specified in request 215.
2. Kernel mode OS system call 230 receives request 225:
   a. Kernel mode OS system call 230 performs the WriteProcessMemory operation and injects the code or data originating from malware 210 into the process specified in request 215.

Thus, using known prior art systems/methods, such as illustrated in FIG. 2, an operating system can be compromised by code injection, thereby potentially allowing malware or threats, and the injected code itself, to go undetected.

Code Injection Checking Module

In a preferred form, any suspicious attempt to write to one or more processes using kernel mode OS system calls, where a process is not simply writing to itself, is intercepted and blocked. The memory space used by a process running in the system can be kept free from code injection by user mode malware that could otherwise avoid user mode security programs (for example security program 240 in FIG. 2).

The operating system maintains system calls to perform a "write to process memory" operation both in user mode and kernel mode. Kernel mode OS system call performs the actual writing to process memory and user mode system call dispatches the request coming from a user mode application program to the kernel mode OS "write to process memory" system call.

The code injection prevention method/system hooks the kernel mode OS system call by replacing a function pointer corresponding to "write to process memory" operation in the kernel mode OS system call table with a "code injection checking module", being another handler. The code injection checking module could also be referred to as a memory guard injection checker.

Code injection checking module, running in kernel mode, verifies the legitimacy of the request based on an algorithm, for example the algorithm presented in Table 1. If the request is legitimate, the "write to process memory" request is allowed. Otherwise the request is denied.

Thus, an unauthorized attempt to inject any code or data to other processes is blocked before the unauthorized injection occurs at run-time by using a code injection checking module (i.e memory guard injection checker).

TABLE 1

```
MemoryGuardInjectionChecker(
TARGET_PROCESS_ID,
MEMORY_OPERATION
)
{
    IF TARGET_PROCESS_ID IS IN PROCESS_DATABASE
        IF MEMORY_OPERATION == MEMORY_WRITE
            REJECT
        ELSE
            ALLOW
    ELSE
        ALLOW
}
```

Figure 3:
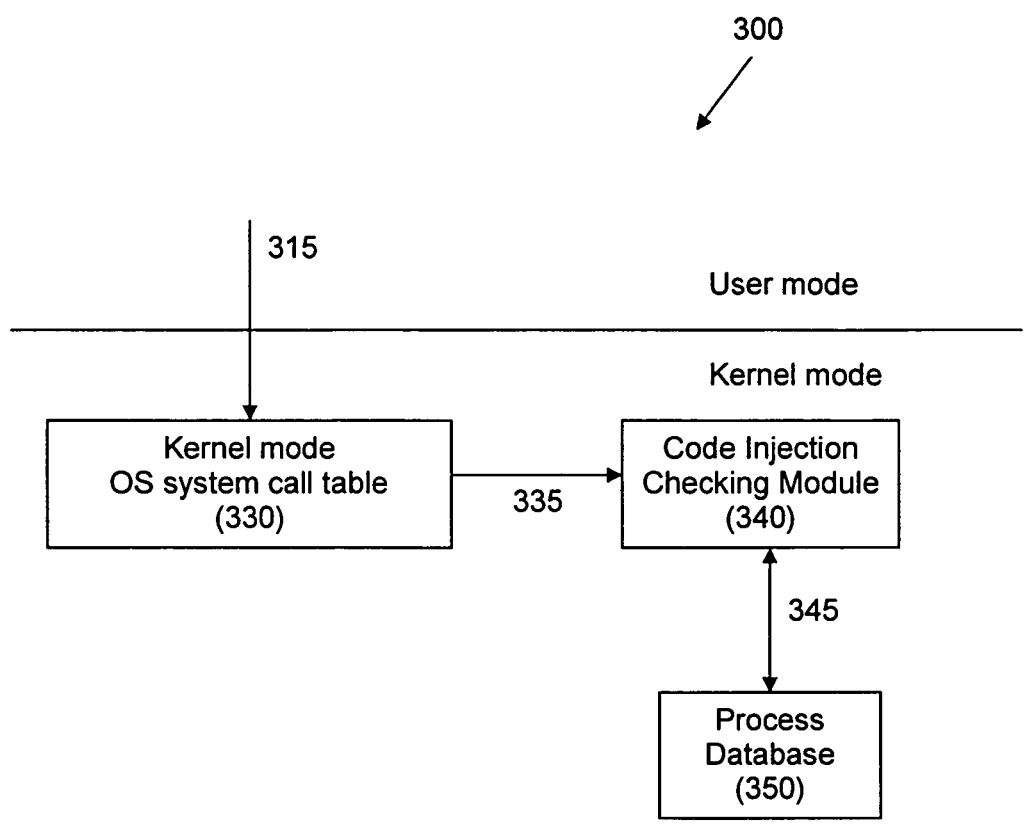
FIG. 3 illustrates an example method to detect and prevent code injection at the kernel mode level of an operating system.

A particular example embodiment of the present invention is now described with reference to FIG. 3, which illustrates a method 300 to detect and block code being injected into an operating system(s). These steps of method 300 are as follows:

1. Code injection checking module 340 hooks kernel mode OS system call 330:
   a. A WriteProcessMemory request 315, either originating from user mode programs or from kernel mode programs, is directed to checking module 340.
2. WriteProcessMemory request 315 is sent to kernel mode OS system call 330:
   a. WriteProcessMemory request 315 is directed to checking module 340 as a request 335.
3. Checking module 340 receives request 335:
   a. Checking module 340 queries a process database 350 via request 345;
   b. Checking module 340 either allows or denies the request 335 according to an algorithm, for example the algorithm presented in Table 1.

Process database 350 can be obtained by using kernel mode OS system call 330, and/or by maintaining a customized table that is constructed whenever a process create and delete event is signalled from the operating system, as described in the assignee's hereinbefore cross-referenced US patent application incorporated herein by reference.

Preferably, the code injection prevention method/system is implemented as a kernel driver to enable direct interaction with kernel mode OS system calls and the process database obtained from the kernel mode operating system. In this preferred form, a system call refers to a kernel mode system call.

In a specific, but non-limiting, example applied to the Windows® operating system, the code injection checking module 340 is implemented as a kernel driver. System calls are implemented as a function table in Windows. Windows kernel exports a global variable, called KeServiceDescriptorTable (i.e. kernel mode OS system call 330), which points to an OS Service Descriptor Table, from which the system call table can be retrieved. NtWriteVirtualMemory (i.e. request 315) is a "write to process memory" operation and can be hooked to intercept this operation. The function prototype is as follows:

```
NtWriteVirtualMemory
NTSYSAPI
NTSTATUS
NTAPI
NtWriteVirtualMemory(
    IN HANDLE ProcessHandle,
    IN PVOID BaseAddress,
    IN PVOID Buffer,
    IN ULONG BufferLength,
    OUT PULONG ReturnLength OPTIONAL
    );
```

Once the NtWriteVirtualMemory function is hooked using a simple function pointer replacement technique, this function is redirected, as a request 335, to code injection checking module 340 of method/system 300. A process ID of the target process can be obtained using the NtQueryInformationProcess function with ProcessBasicInformation information class. The process ID of the current process that initiated NtWriteVirtualMemory can be obtained using the PsGetCurrentProcessId function. The code injection checking module 340 then runs the algorithm presented in Table 1 and rejects NtWriteVirtualMemory. An attempt (preferably every attempt) to access process memory space, other than processes' own memory space, are checked by the code injection checking module 340 as described in the algorithm presented in Table 1.

Process database 350 can be obtained as described in the assignee's hereinbefore cross-referenced US patent application, or using NtQuerySystemInformation with SystemProcessesAndThreadsInformation information class. Process database 350 is consulted, as request 345, to run a checking algorithm, for example the algorithm presented in Table 1.

The present invention may be implemented separately as a stand-alone driver, module, program or software, or in combination with other drivers, modules or programs as a software package. When the present invention is embodied as a software package, the software package can be used to detect and remove malware from a processing system or device, such as a computer, computer system, PDA, mobile or cellular telephone, or a wide variety of other similar devices.

Whilst an example embodiment has been described with reference to the Microsoft Windows® operating system, the present invention can be readily applied to many other operating systems and should not be considered to be limited only to the Microsoft Windows® operating system.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, or an embodiment combining software and hardware aspects.

The claims defining the invention are as follows:

1. A computer-implemented method of preventing code injection in an operating system, the method comprising:
   establishing a hook to intercept requests for a kernel mode operating system (OS) system call, wherein hooking the kernel mode OS system call comprises replacing a function pointer corresponding to the request;
   directing a request sent to the kernel mode OS system call to a checking module, the checking module being run in a kernel mode, wherein the request originates from a first program, the first program being a kernel mode program, and wherein the request is directed to a target process;
   determining a process identifier of the target process;
   determining a process identifier of the first program that initiated the request;
   querying a process database to verify whether the process identifier of the target process and the process identifier of the first program are the same, wherein the process database is updated whenever a process create event or a process delete event is signaled from the operating system; and
   upon determining that the process identifier of the target process is different than the process identifier of the first program that is stored in the process database and upon determining that the request is a write to process memory operation of the target process, denying the request.

2. The method as claimed in claim 1, wherein the process database uses an algorithm to produce the response.

3. The method as claimed in claim 1, wherein the request is allowed or denied before injected code is executed in an injected process.

4. A computer program product for preventing code injection in an operating system, the computer program product comprising a computer-readable storage device having instructions thereon, the instructions comprising:
   code programmed to establish a hook to intercept requests for a kernel mode operating system (OS) system call, wherein hooking the kernel mode OS system call comprises replacing a function pointer corresponding to the request;
   code programmed to receive a request sent to the kernel mode OS system call, the checking module being run in a kernel mode, wherein the request originated from a first program, the first program being a kernel mode program, and wherein the request is directed to a target process;
   code programmed to determine a process identifier (ID) of the target process;
   code programmed to determine a process identifier of the first program that initiated the request;
   code programmed to query a process database to verify whether the process identifier (ID) of the target process and the process identifier (ID) of the first program are the same, wherein the process database is updated whenever a process create event or a process delete event is signaled from the operating system; and code programmed to receive a response from the process database; and upon determining that the process identifier (ID) of the target process is different than the process identifier (ID) of the first program that is stored in the process database and upon determining that the request is a write to process memory operation of the target process, code programmed to deny the request.

5. The computer program product as claimed in claim 4, wherein the computer program product is a kernel driver.

6. The computer program product as claimed in claim 4, wherein the process ID of the target process of the request is obtained using a query information function with a process information class.

7. The computer program product as claimed in claim 6, wherein a process ID of a process that initiated the write to memory operation is obtained using a get current process ID function.

8. A system for preventing code injection in an operating system, the system comprising:
  (1) at least one memory to store a process database; and,
  (2) a processor, in communication with the at least one memory, the processor configured to:
  (a) establish hook to intercept requests for a kernel mode operating system (OS) system call, wherein hooking the kernel mode OS system call comprises replacing a function pointer corresponding to the request;
  (b) receive a request sent to the kernel mode OS system call, the checking module being run in a kernel mode, wherein the request originates from a first program, the first program being a kernel mode program, and wherein the request is directed to a target process;
  (c) determine a process identifier of the target process;
  (d) determine a process identifier of the first program that initiated the request;
  (e) query the process database to verify whether the process identifier of the target process and the process identifier of the first program are the same, wherein the process database is updated whenever a process create event or a process delete event is signaled from the operating system; and
  (f) receive a response from the process database; and
  (g) upon determining that the process identifier of the target process is different than the process identifier of the first program that is stored in the process database and upon determining that the request is a write to process memory operation of the target process, deny the request.

* * * * *